G. W. DUDLEY.

TYPE WRITER.

APPLICATION FILED JUNE 1, 1912.

Reissued Mar. 11, 1913.

13,543.

2 SHEETS—SHEET 1.

WITNESSES:

E. M. Wells

M. W. Foote

INVENTOR:

George Wilson Dudley

By Jacob Felbel

HIS ATTORNEY

G. W. DUDLEY.
TYPE WRITER.
APPLICATION FILED JUNE 1, 1912.
Reissued Mar. 11, 1913.
13,543.
2 SHEETS—SHEET 2.
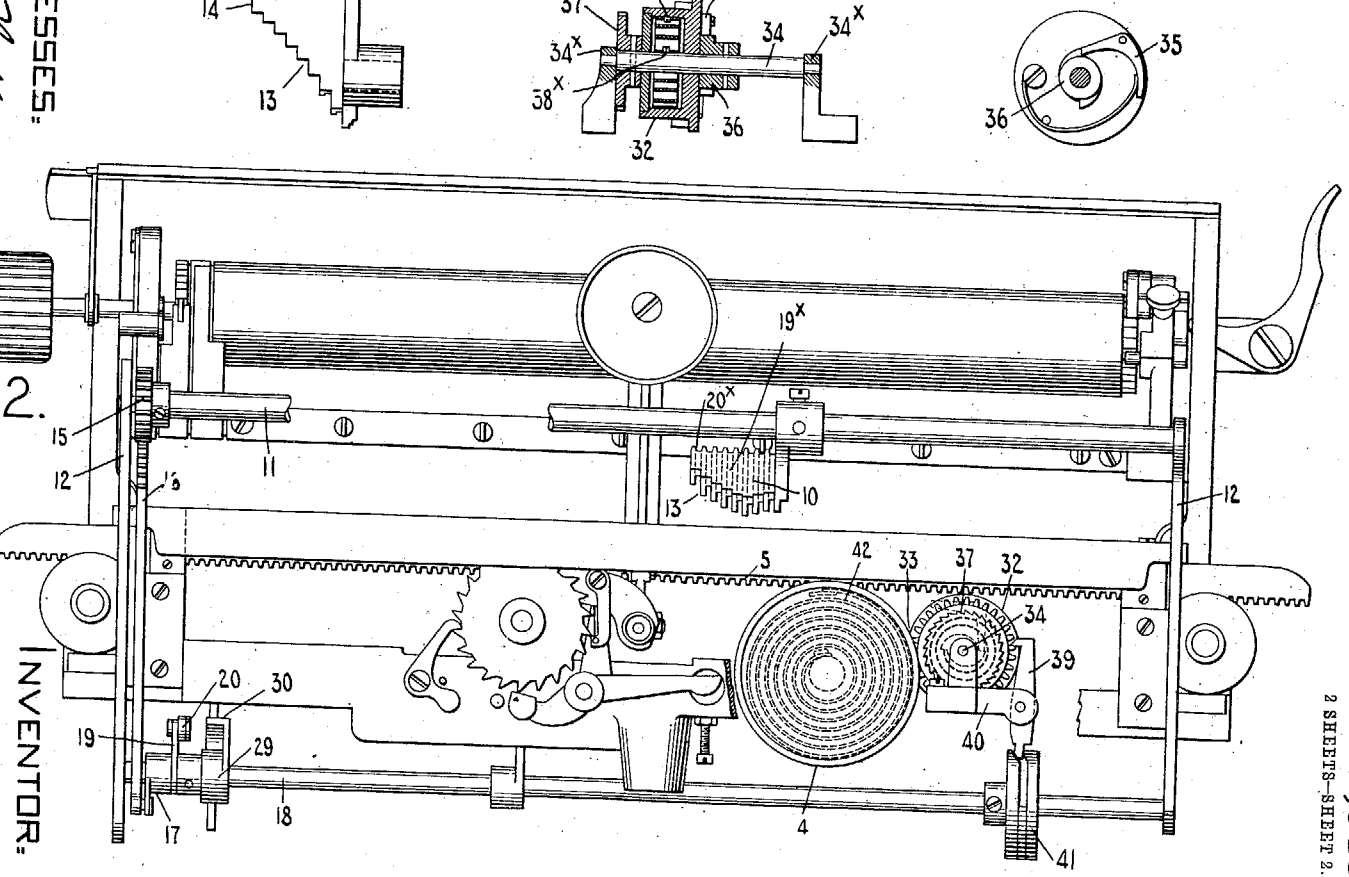
FIG. 2.
FIG. 4.
FIG. 3.
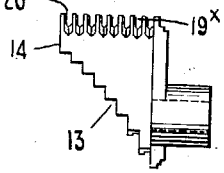
FIG. 5.
WITNESSES:
E. M. Wells
M. W. Poole
INVENTOR:
George Wilson Dudley
By Jacob Felbel
HIS ATTORNEY

UNITED STATES PATENT OFFICE.

GEORGE WILSON DUDLEY, OF STAUNTON, VIRGINIA, ASSIGNOR TO OSCAR WOODWARD, OF MONTCLAIR, NEW JERSEY.

TYPE-WRITER.

13,543. Specification of Reissued Letters Patent. Reissued Mar. 11, 1913.

Original No. 960,854, dated June 7, 1910, Serial No. 324,451. Application for reissue filed June 1, 1912. Serial No. 701,055.

*To all whom it may concern:*

Be it known that I, GEORGE W. DUDLEY, citizen of the United States, residing at Staunton, Virginia, have invented certain new and useful Improvements in Type-Writers, of which the following is a specification.

My invention relates to tabulating mechanism for typewriters and one object is to provide a series of stops one for each column which by co-acting with the tabulating stop will enable the carriage to be instantly set at any desired position for printing in the proper position in that column the figure of the desired denomination. I aim also to provide a tabulator in which by moving an index to the proper position on a scale the paper carriage will be brought to position for printing the number accurately according to its denomination.

In carrying out my invention I provide a hand operated device such as a lever at or adjacent the key board and by moving this in relation to a suitable scale or dial the paper carriage can be moved to or set in different positions according to the marks on the said scale. I have sought also to provide automatically operating means for taking up the shock incident to releasing the carriage to be impelled by its spring freely and then arresting it suddenly, said means being thrown into operation automatically when the tabulating is to be done but being normally inactive as against the force of the carriage spring.

The invention consists in the features and combination and arrangement of parts hereinafter described and particularly pointed out in the claims.

Figure 1:
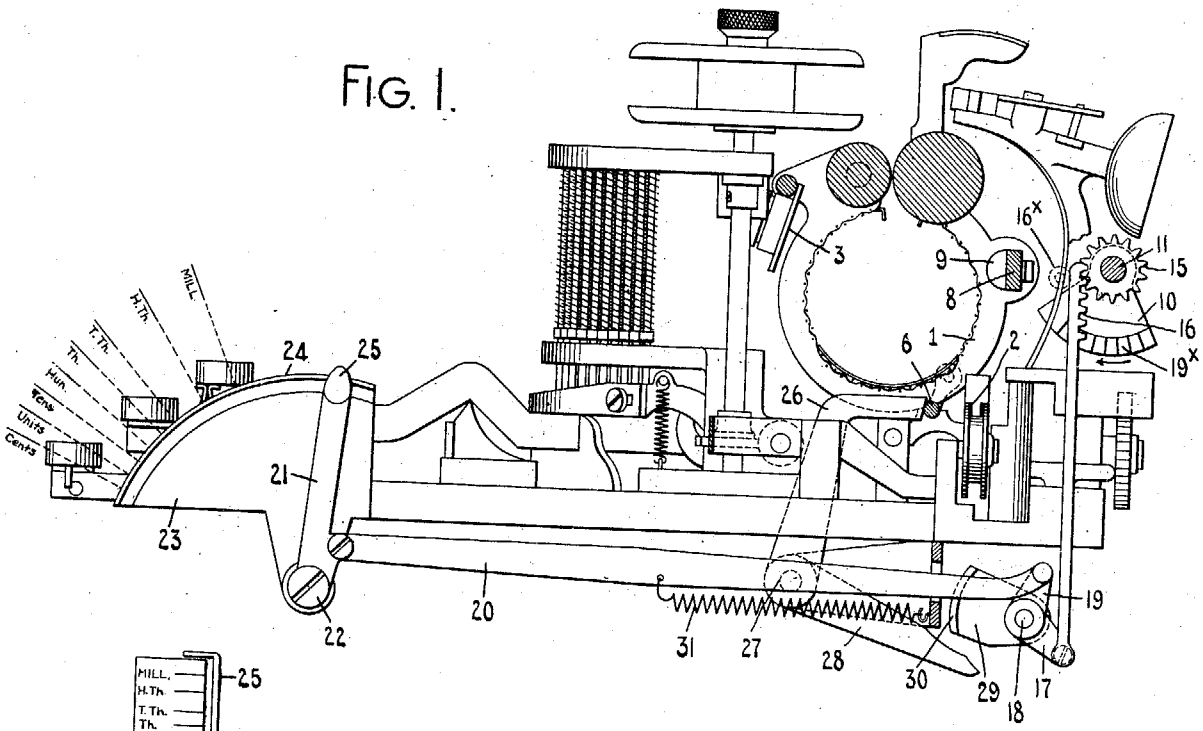
Figure 1A:
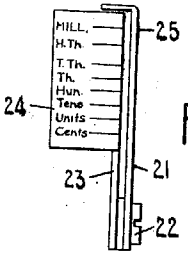

In the accompanying drawings, Figure 1 is a side view of a typewriting machine of the Hammond type with parts in section and parts omitted. Fig. 1[a] is a detail view of the scale and the lever coöperating therewith. Fig. 2 is a rear view of the machine with parts omitted. Fig. 3 is a detail view relating to the cushioning or retarding spring, this being a section along the cushioning spring shaft. Fig. 4 is a side view of the drum of the cushioning spring. Fig. 5 is a plan view of the tabulating stop.

While I have shown my invention as embodied in a machine of the Hammond type it will be understood that I do not limit myself in this respect as the invention may be applied to other styles of machines.

In the drawings the paper carriage is shown at 1 guided as usual upon rollers 2, 3 and under tension of a spring in a barrel or drum 4, which is connected to the carriage through the rack 5 and a suitable gear.

The escapement of the Hammond machine being well known needs no description herein. In order to release the carriage the Hammond machine is provided with a release bar 6 extending lengthwise beneath the carriage from end to end thereof. When this release bar or "disengaging rod" is forced to the rear the "disengaging sleeve" is operated, a part of which is shown at 7, and this action frees the carriage from its escapement to allow it to run free to the left under the action of the spring in the barrel 4. By my invention the carriage will be set free as just described and will be arrested at the point desired by the operator for performing the tabulating work. This release bar 6 is substantially the same in function and arrangement as that disclosed in the patent of the United States, granted to James B. Hammond, September 20, 1883, No. 290,419, and the escapement mechanism controlled by this release bar is the same as that disclosed in said patent.

The stops on the carriage are supported in or fixed to a bar 8 fixed to the bar 9 forming a part of the machine. These are set permanently in position at regular distances apart in the present instance or these distances may be irregular so long as the stops are set apart distances corresponding to the letter spaces.

The tabulating stops which are thrown into and out of line with the stops on the carriage are formed on a segmental piece 10 fixed to a rock shaft 11 at the rear of the machine, said rock shaft being journaled in brackets 12 secured to the main frame. This segment has an inclined edge 13 notched as shown to provide a series of stop shoulders located at different points longitudinally of the machine. Each stop shoulder is the same distance radially from the axis of the shaft as its fellows and when the shaft is turned the effect is to bring one stop shoulder after the other into the range of the stop on the carriage. For instance supposing the segment to be turned so that the uppermost stop shoulder 14 on the segment is in line with the carriage stop and the carriage is free to move, then said carriage stop will strike the tabulating stop 14 and the carriage will be arrested but if the segment continues its swinging movement then the carriage stop will move step by step to the left striking the shoulders in succession but when the segment ceases in its swinging movement the carriage stop by striking the shoulder on the segment then in line with it will be arrested thereby, thus determining the position of the carriage for tabulating as will be more particularly described hereinafter.

The rock shaft is operated through a gear 15 thereon and a rack 16 held in engagement with said gear by a roller 16x, Fig. 1 on one of the brackets, the said rack at its end being connected with an arm 17 fixed on rock shaft 18 journaled in the said brackets 12. The rock shaft is operated by an arm 19 fixed thereto, a link 20 connected to said arm, a lever 21 connected to the said link and pivoted at 22 to a bracket 23 carrying a dial 24 having marked thereon the scale "Millions," "Hundred thousands," "Tens thousands," "Thousands," "Hundreds," "Tens," "Units" and "Cents." The lever 21 is provided with a pointer 25 to move over the said scale.

It will be obvious that by drawing the hand lever 21 forward so that the pointer 25 moves over the dial 24 the tabulating-stop-segment 10 will be turned in the direction of the arrow Fig. 1 to bring its stop shoulders in line with the stop on the paper carriage.

In order to set the paper carriage with its stop against the appropriate tabulating stop on the segment it is necessary to disengage the carriage from its escapement mechanism to allow it free movement toward the left under the action of its spring. This disengaging action takes place simultaneously with the swinging movement of the tabulating segment and from the same set of connections. This mechanism consists of an arm 26 fixed on the shaft 27 to which also is fixed another arm 28 reaching down within range of an arm 29 fixed on the shaft 18. This arm has a portion or rim 30 concentric with its axis of rotation and the end of the arm 28 is curved to correspond.

When the shaft 18 is turned to operate the gear connections leading to the tabulating segment or stop carrier the same movement causes the arm 29 to press the arm 28 downwardly thus swinging the arm 26 rearwardly so that its end will force back the "disengaging rod" 6 and through the well known Hammond disengaging sleeve the carriage will be disconnected from its escape wheel and left free to be impelled to the left by its spring, but meantime the stop shoulder on the tabulating member or segment has gotten in position to arrest the movement of the carriage, alining up for this purpose with the stop on the carriage.

It will be seen that by reason of the concentric part 30 of the arm 29 the arm 28 when depressed to disengage the carriage will be held down in this position thus maintaining the carriage free while the tabulating segment is continuing its movement if this is necessary to bring the carriage to the desired point.

If the pointer 25 is moved to the million mark the first shoulder or stop on the tabulating segment is brought into range of the carriage stop and the carriage being released will be arrested thereby. The lever 21 is immediately released after being moved to the desired mark on the scale and thereby the spring 31 is allowed to exert its force to draw the disengaging arm 26 away from the disengaging rod and to return the segment 10 bearing the tabulating stop back to normal position. The withdrawal of the disengaging mechanism takes place however before the tabulating segment in moving back to normal position removes its stop shoulder from the stop on the carriage so that the carriage escapement is again engaged in order to hold the carriage in the position desired.

If the hand lever 21 is operated over the entire dial the segment will be swung and the carriage will be released as before and the carriage stop will engage in succession each one of the stop shoulders on the tabulating segment, the carriage performing a step by step movement while the segment is swinging.

As soon as the hand lever is released however the segment returns to normal position as above described and the disengaging connections are withdrawn to allow the carriage escapement to connect up again with the carriage to hold the same in the position which it is intended it should occupy.

It will be understood that in adjusting the carriage for the tabulating work the said carriage is stopped by the shoulder on the tabulating segment just one letter space in advance of the position it is to occupy and then when the tabulating segment is returned to normal position the carriage escapement is thrown into engagement with the carriage and arrests the same as soon as it makes another letter space movement and this is the position which the carriage is to occupy as a result of the operation of the tabulating lever.

The tabulating segment is grooved on its rear side as shown at 19x to allow the segment to return to normal position the groove passing over the stop on the carriage during the return movement of the segment. The upper ends of these grooves are beveled as shown at 20x in Fig. 2 so that if the segment is turned upwardly when one of the carriage stops is standing thereover the said stop will pass into the groove without interference owing to the flare of the grooves formed by the bevels mentioned. This action of the segment rising when the stop on the carriage is standing in line therewith is sometimes necessary in operating the machine, that is, when the carriage happens to be for instance in a position with its stop in line with the "hundredths" shoulder and it is desired to set the carriage for writing "cents." The lever being operated the segment will rise past the carriage stop by reason of the grooved construction just described bringing first the "tens," then the "units" and finally the "cents" shoulder in line with the stop on the carriage.

It will be observed from Fig. 1 that the shoulders of the swinging tabulator stop are at the same radial distance from the center of rotation. In other words, all of these stops swing in the plane in which the stop on the carriage is located. Consequently, in order to bring into action, for instance, the stop shoulder which lies at the greatest distance from the carriage stop in the position of the parts shown in Fig. 1 it is necessary to have the block or piece 10 which carries the shoulders, grooved to allow the said block to pass over the carriage stop so as to locate the proper shoulder in connection therewith, should it happen that the stop on the carriage is standing opposite the segmental block before the same is operated. Furthermore, in the operation of the tabulator, supposing the segmental block is swung upwardly so that its first stop is in line with the stop on the carriage, when the said carriage is released the said carriage stop will then strike against the first shoulder of the tabulator stop and the continued movement of the swinging segment will cause the carriage stop to strike one after the other of the tabulator stops until the hand lever 25 has been positioned at the desired denomination, and supposing this to be one that presents the shoulder at the extreme right of Fig. 1 to contact with the carriage stop it will be obvious that in order to allow the tabulator stop to return to normal position without altering the position of the carriage it will be necessary to have the tabulator stop grooved to pass over the carriage stop.

A serious objection to tabulating arrangements on typewriters has been due to the excessive impact of the carriage under the strong force of its spring against the tabulating stop.

One object of my invention is to reduce the force of this impact while tabulating by reducing or counteracting the force of the carriage spring but the arrangement is such that when the machine is doing ordinary writing the full force of the carriage spring, according to its adjustment at that time is applied to the carriage. This action of lessening and increasing the force of the carriage spring upon the carriage according as tabulating is being done or ordinary writing is an automatic one being controlled from the connections leading from the tabulating lever so that when said lever is operated to set the parts for tabulating the force applied to the carriage is lessened and when the lever is moved the other way the normal power of the spring is applied to the carriage. This automatic regulating mechanism consists of a supplemental spring drum 32 geared to the gear of the main spring drum as at 33, said supplemental drum containing a spring which in its action is opposed to the action of the spring in the main spring drum. Ordinarily however the supplemental spring drum rotates freely with the main spring, that is when ordinary printing is being performed. For this purpose the shaft 34 upon which the supplemental spring drum is supported is arranged to turn loosely in its bearings 34x. The supplemental or what may be called the cushioning or retarding spring drum is provided with a pawl 35 engaging a toothed block 36 fixed to the said shaft 34, said block having only two teeth. The shaft also has fixed thereto a ratchet wheel 37. The spring within the drum has one end secured to the shell of the drum at 38 and at its other end 38x it is secured to the shaft. All of these parts on the shaft 34 during ordinary printing rotate freely with the shaft 34 and offer no opposition or cushioning effect to the operation of the main spring drum. The cushioning drum however is free to be turned about its shaft 34 under the action of the main spring drum when said shaft is held stationary, and this action will cause the cushioning spring of the supplemental drum to be thrown into opposition to the spring of the main spring drum. In order to hold the shaft 34 stationary for this cushioning or opposing action of the supplemental spring a detent 39 is provided pivoted to a bracket 40 supported on the main frame of the machine, said detent being controlled by a grooved cam 41 on the shaft 18.

When the tabulating lever is operated the cam 41 will be turned and the detent 39 will be thrown into engagement with the ratchet 37 and thus the shaft 34 will be held stationary while the supplemental drum 32 will be turned around it by the action of the spring 42 in the main drum. The main drum will thus be turning against the opposition or resistance of the spring in the supplemental drum which will thus act to reduce the impact of the carriage.

When the tabulating lever is moved back to normal position the detent 39 will be released from the ratchet 37 and the supplemental drum together with its shaft and the ratchets thereon will then turn as one body without resisting the action of the main spring.

In tabulating it will be understood that the tabulating lever need not be held forward but is simply released after it has been drawn forward to the proper point on the scale.

I claim:—

1. In combination with a typewriter carriage, a stop thereon, a rotary shaft, fixed bearings adjacent the path of the carriage in which said shaft is journaled, a rotary tabulator device mounted on the said shaft and having a series of shoulders to contact with the stop on the carriage, means for releasing the carriage from its escapement, and a lever with connections for turning the said shaft to rotate the tabulator device in one direction continuously by one movement of the lever to bring the shoulders thereon in succession in said continuous movement into line with the stop on the carriage and a scale indicating the different denominations and over which the lever moves, substantially as described.

2. In combination with a carriage having a stop thereon, a segment having a series of stop shoulders thereon and having grooves to pass over the stop of the carriage, and means for operating the said tabulator, substantially as described.

3. In combination with a typewriter carriage having a stop, a swinging tabulator having a stop thereon, a rock shaft carrying the tabulator and the gear, the rack, the rock shaft for operating the rack, a disengaging rod for the carriage escapement an arm on the last mentioned rock shaft having a concentric portion, a lever to be operated thereby for operating the disengaging rod, said lever being maintained in operated position while the tabulator stop is being set, and means at the key-board for operating the rock shaft, substantially as described.

4. In combination with a typewriter carriage, a disengaging rod for controlling the escapement thereof mounted on the carriage, a stop upon the carriage, a rotary shouldered tabulator stop, a lever on the fixed frame, connections between the said lever and the rotary tabulator stop and the disengaging rod, respectively, the said connection for the disengaging rod being arranged to hold the said rod in its operated position while the tabulator continues its rotary movement to present one shoulder after another to the carriage stop, substantially as described.

5. In combination with a carriage and its escapement, an impelling spring, means for releasing the carriage from its escapement, a drum for the impelling spring, a second drum geared to the first drum and having a spring therein, the said second drum with its spring normally rotating freely, and means for causing the second spring to oppose the action of the impelling spring when the carriage is released from its escapement, substantially as described.

6. In combination with a typewriter carriage, means for releasing the same from its escapement mechanism, an impelling spring, a drum therefor, a cushioning spring, a drum therefor, gearing between the drums, a shaft upon which the second mentioned drum is supported, a ratchet wheel on the said shaft, a pawl to engage the said ratchet wheel, means for operating the pawl when the carriage is released from its escapement to hold the said shaft with one end of the cushioning spring rigid and allow the said spring to oppose the force of the impelling spring, substantially as described.

7. In combination with a typewriter carriage, a tabulator, a rock shaft, connections between the rock shaft and the tabulator, means at the key-board having connections to the rock shaft to operate the same, means for releasing the carriage from its escapement, means normally inactive adapted to be thrown into operation when the tabulator is operated, to oppose the movement of the carriage under the force of its impelling spring, a pawl for controlling the said opposing means, and a cam on the rock shaft for operating the said pawl, substantially as described.

8. In a typewriting machine, the combination of a carriage, a carriage impelling spring, carriage releasing means, a drum for the impelling spring, a speed regulating drum permanently geared to the first drum and normally rotating idly in correspondence therewith, and means for rendering said speed regulating drum effective on the carriage when the carriage is released for rapid movement in letter space direction.

9. In a typewriting machine, the combination of a carriage, a spring for impelling the carriage, a column stop, a coöperative key-actuated tabulating stop, carriage releasing mechanism, a gear rotative by said spring, a pinion coöperative with said gear, and a regulating device operated by said pinion and rendered effective on the carriage by the actuation of said key actuated stop.

10. In a typewriting machine, the combination of a carriage, carriage feeding devices, carriage releasing means, and a regulating device supported on the machine frame and permanently connected to the carriage but effective to retard the carriage only when the carriage is released from its feeding devices and rapidly advanced in letter space direction.

11. In a typewriting machine, the combination of a carriage, carriage speed regulating means comprising a part constantly geared to the carriage, said means being normally ineffective to retard the movement of the carriage, and key actuated means for rendering said regulating means effective on the carriage.

12. In a typewriting machine, the combination of a carriage, tabulating mechanism, speed regulating means for the carriage, which means are supported on the machine frame and comprise a part that is constantly connected to the carriage when traveling in letter space direction, and means whereby said speed regulating means are rendered effective on the carriage only when the tabulating mechanism is actuated.

In testimony whereof, I affix my signature in presence of two witnesses.

GEORGE WILSON DUDLEY.

Witnesses:
J. G. DUDLEY,
HARRY BURNETT.

Copies of this patent may be obtained for five cents each, by addressing the "Commissioner of Patents. Washington, D. C."